United States Patent
Stampfli

[15] 3,646,969
[45] Mar. 7, 1972

[54] VALVE MECHANISM
[72] Inventor: Harald Stampfli, Petit-Saconnex, Switzerland
[73] Assignee: Lucifer S.A., Carouge-Geneva, Switzerland
[22] Filed: Mar. 23, 1970
[21] Appl. No.: 21,723

[30] Foreign Application Priority Data

Apr. 22, 1969 Switzerland ..........................6037/69

[52] U.S. Cl..................137/627.5, 137/625.66, 251/77, 251/174
[51] Int. Cl......................................................F16k 11/04
[58] Field of Search ..........137/627.5, 625.66, 625.6, 596.18

[56] References Cited

UNITED STATES PATENTS

| | | | |
|---|---|---|---|
| 3,091,255 | 5/1963 | Wahlstrom | 137/627.5 |
| 3,415,284 | 12/1968 | Stampfli | 137/625.66 |

FOREIGN PATENTS OR APPLICATIONS

| | | | |
|---|---|---|---|
| 1,235,320 | 5/1960 | France | 137/627.5 |
| 1,024,758 | 4/1966 | Great Britain | 137/627.5 |
| 1,121,417 | 1/1962 | Germany | 137/627.5 |

*Primary Examiner*—Robert G. Nilson
*Attorney*—Emory L. Groff and Emory L. Groff, Jr.

[57] ABSTRACT

A valve mechanism including a movable system carrying two valve members closing selectively two channels through engagement with their seats, at least one valve member being carried floatingly by a spring with the interposition of a rigid member fitted over the outer peripheral deformable edge of an intermediate yielding washer or the like member engaging through its inner peripheral edge the valve member considered. Similarly the seat of another valve member may be carried floatingly by a spring and form a rigid annular member fitted over the inner deformable edge of an intermediate yielding washer or the like member engaging through its outer peripheral edge the inner surface of the body of the valve mechanism. In all cases, the two valve members are held both in their closed condition for an intermediate position between the open positions of either valve member. Thus, an annular yielding member fitted coaxially in a rigid member subjected to the action of a spring engages fluidtightly through said yielding member a valve member or a seat for the latter according to the case, whereby said spring urges the rigid member into engagement with the cooperating seat or cooperating valve member respectively.

4 Claims, 1 Drawing Figure

PATENTED MAR 7 1972
3,646,969
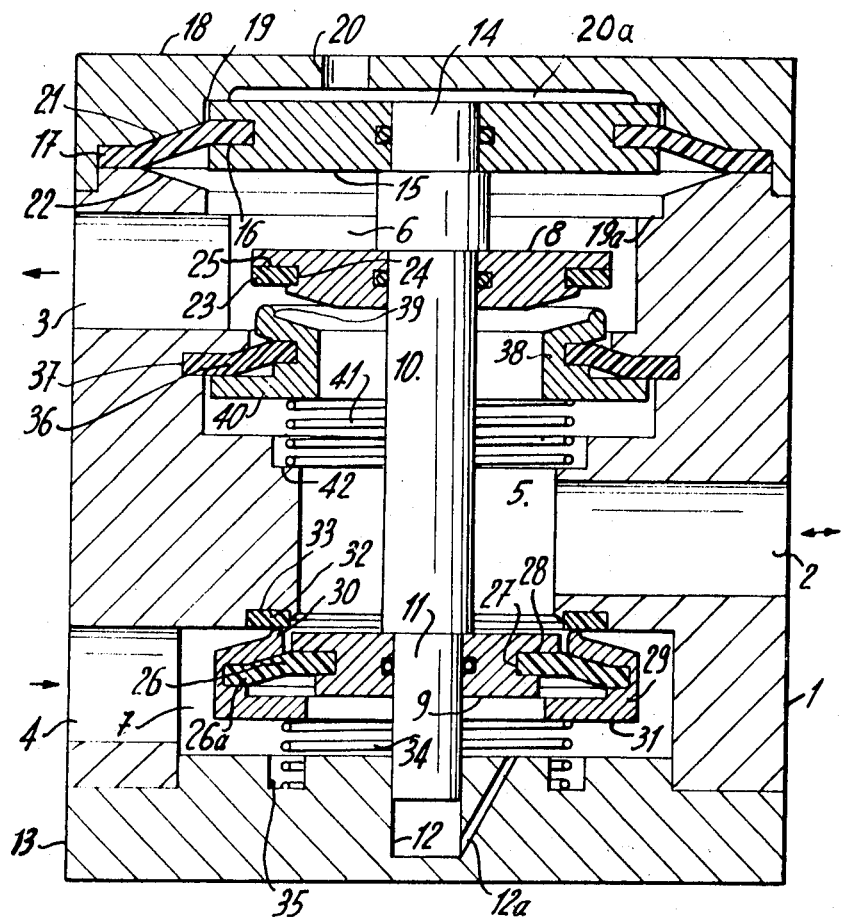
INVENTOR
HARALD STAMPFLI
BY Emory L. Groff Jr.
ATTORNEY

VALVE MECHANISM

The invention relates to improvements in the valve mechanism disclosed in the U.S. Pat. No. 3,415,284 dated Dec. 10th 1968 which discloses at least two valve members fitted on a movable part in a manner such that one of them is in its closed position when the other is in its open position, and conversely.

The valve disclosed in the above-mentioned U.S. Pat. No. 3,415,284 includes for each valve member an intermediate yielding member adapted to be clamped between the valve member and the corresponding seat, said yielding member engaging both the valve member and the corresponding seat before the end of the closing stroke of the valve member considered so as to seal the passage provided between the cooperating seat and valve member, said yielding member being elastically deformed as soon as it engages the cooperating seat and valve member and this deformation lasting until said valve member has brought its closing stroke to an end. Now it has been found that in such a valve, the yielding intermediate member has a tendency when the valve member is in its open position to oscillate and hover under the action of the flow of fluid, which disturbs said flow and renders it irregular. On the other hand, when the valve member remains a long time in its closed positions, the intermediate member is substantially loosened since the latter is made of rubber or the like material and this results in that said intermediate member has a tendency to enter an intermediate position instead of retaining its original flat position. Consequently, several channels are transiently interconnected, which leads to leaks and losses of head.

The present invention has for its object to produce a valve mechanism ensuring an accurate closing of one channel before the opening of the other channel while a constant flow of fluid is furthermore obtained. This object is reached in accordance with the present invention by means of a rigid member fitted over the deformable edge of the intermediate yielding member, said rigid member being subjected to the action of a spring and engaging the seat of the corresponding valve member at the moment of the closing of the latter.

The accompanying drawing illustrate diagrammatically and by way of example a preferred embodiment of the invention.

The single FIGURE of the drawing is a sectional view of a valve mechanism including two valve members of which one is in its closed position and the other in its open position.

The valve mechanism illustrated comprises a body 1 provided with two openings 2 and 3 ensuring respectively a connection with the apparatus to be served and an exhaust for the fluid, said valve mechanism being provided with a further opening 4 connected with a supply of pressure. These different openings lead respectively to the corresponding chambers 5, 6 and 7 formed coaxially within said body 1. The valve mechanism includes furthermore an upper valve member 8 and a lower valve member 9 carried by and fixed to a movable central rod 10 of which one end 11 is slidably carried in a blind bore 12 formed in a cover 13 secured to the body 1. A cut 12a connects the bore 12 with the chamber 7. The other end 14 of the rod 10 carries a disc 15 the outer periphery of which is provided with an annular groove 16 in which is fitted the inner edge of a yielding washer 17 made of a suitable elastomer. The outer free edge of said washer 17 is clamped between the body 1 of the valve mechanism and a cover 18 secured by means which are not illustrated to the upper end of said body.

The cover 18 is provided with an inner shoulder 19 engaged by said disc 15 at the end of its upward stroke as illustrated, that is when it reaches the position illustrated. The disc 15 is, on the other hand, adapted to engage a shoulder 19a formed in the body 1 of the valve mechanism, at the end of its downward stroke, that is for the lowermost position of the rod 10.

It is apparent that the medial section of the washer 17, which is not held fast, engages alternatingly according to the position assumed by the disc 15 the sloping shoulders 21 and 22 provided respectively in the cover 18 and in the upper section of the body 1 of the valve mechanism. In the position illustrated in the drawing, the yielding washer 17 engages the sloping shoulder 21 of the cover 18. Said cover is provided furthermore in proximity of its central section with a port 20 ensuring communication with an auxiliary control system which is not illustrated, said port leading into the chamber 20a formed in the body 1 above the disc 15.

The upper valve member 8 is provided along its outer periphery with a packing 23 providing a seat portion made of a suitable elastomer and forming the bearing surface of said valve member. Said packing is inserted in a groove 24 of the valve member, so as to engage the peripheral annular part 25 of the latter, the outer diameter of said packing registering with the outer diameter of said valve member.

The lower valve member 9 carries along its outer periphery an intermediate yielding member constituted by a washer 26 which is also made of an elastomer while its outer diameter is larger than the diameter of the valve member, so that the outer edge 26a of said washer is readily deformable. The inner periphery of the washer is fitted in an annular groove 27 of the valve member 9 and engages the flat peripheral annular section 28 of the latter.

A rigid ring member 29, the cross section of which is U-shaped, encloses the yielding deformable edge 26a of the washer 26. The upper flange of said rigid member is provided with a rounded terminal area 30 engaging for the closed position illustrated the seat of the valve member, which seat is constituted by a washer 32 providing a seat portion fitted in an annular recess 33 formed in the body 1 of the valve mechanism. The lower flange of said rigid U-shaped member 29 is provided with a flat lower surface 31 serving as a bearing surface for a lower helical spring 34, of which the end is furthermore housed in an annular groove 35 formed in the lower cover 13 of the valve mechanism. The closing by means of the upper valve member 8 is obtained in a manner similar to that which has just been disclosed for the lower valve member 9. The chief difference resides in the fact that the seat is carried floatingly instead of the valve member by the yielding deformable edge of the washer 36 of which the outer periphery is fitted in an annular groove 37 formed in the body 1 of the valve mechanism. An also U-shaped rigid ring member 38 encloses the inner yielding edge of the washer 36. The upper flange 39 of said rigid member is rounded along its terminal area and forms the actual seat which, for the closed position of the valve member 8, engages the packing 23 carried by the latter.

Said rigid U-shaped member 38 is subjected also to the action of a helical spring 41 inserted between the lower flat surface 40 of said rigid member and an annular shoulder 42 provided in the body 1 of the valve mechanism.

In the upper position of the valve member illustrated, a connection is established between the chambers 5 and 6, whereas the connection is cut off between the chambers 5 and 7 by reason of the fact that the rigid member 29 is urged onto the seat 32 by the spring 34. The valve is held in said position by the fluid pressure prevailing in the chamber 7.

In an intermediate position, which is not illustrated and for which the movable system, including the central rod 10, the disc 15 and the upper and lower valve members 8 and 9, has executed a fraction of its stroke towards its lower position, the packing 23 of the upper valve member 8 engages the rounded area 39 of the rigid member 38 forming the seat of the valve member. The spring 41 urges said rigid seat-forming member against the packing 23. On the other hand, the spring 34 continues exerting its action on the lower rigid member 29 so as to urge the latter against the seat 32 cooperating with the lower valve member 9. Consequently, any undesired connection between the three chambers 5, 6 and 7 is avoided.

Before the movable system carried by the rod 10 reaches its lower position at the end of its downward stroke, a connection is established between the chambers 5 and 7 at 30–32, while it is cut off between the chambers 5 and 6 as provided by the engagement between the upper valve member 8 and its seat constituted by the rigid member 38. Finally, the disc 15 rests on the lower shoulder 19a limiting the downward stroke of the movable system. The uppermost limit of the upward stroke of the system is defined by the upper shoulder 19 engaged by the disc 15. By reason of such a limitation of the stroke of the movable system, the parts forming the movable system occupy well-defined positions at each end of the stroke. Fluidtightness is ensured by the rigid member 29 or 38 when it enters its closed sealing position, since it is then subjected to the pressure of the corresponding spring 34 or 41.

On the other hand, it is found that the arrangement including rigid members prevents the valve member or the seat from oscillating or floating when in an open position, which would disturb the flow of fluid. The invention provides thus a valve mechanism ensuring a constant flow of fluid.

Obviously, the arrangement described may, without any difficulty, be incorporated in more complex valve mechanisms provided with a larger number of valve members fitted on a common movable member.

I claim:

1. A valve mechanism comprising a valve body, a central rod and first and second valve assemblies arranged so that one is in closing position when the other is in open position and inversely; the first valve assembly comprising a valve member fixed on the central rod, and having a seat portion, a rigid ring adapted to engage said seat portion, and a first washer of elastic material engaged at its inner and outer peripheries in circular grooves in said valve body and ring, respectively, permitting axial movement of the ring with respect to the valve body, the second valve assembly comprising a second rigid ring, an intermediate valve member fixed to the central rod, and a second washer of elastic material engaged at its inner and outer peripheries in circular grooves in said second ring and intermediate valve member, respectively, permitting said second ring to have an axial movement with respect to the central rod, a seat portion on the valve body adapted to be engaged by said second rigid ring, and a spring engaging each rigid ring.

2. A valve mechanism as claimed in claim 1, wherein the radial cross section of the rigid ring is U-shaped.

3. A valve mechanism as claimed in claim 1, wherein the spring engaging each rigid ring urges its respective ring towards the seat portion adapted to be engaged thereby.

4. A valve mechanism as claimed in claim 1, wherein the control rod is axially shiftable, and the spring engaging each rigid ring urges its respective ring towards the seat portion adapted to be engaged thereby to make it engage the latter during the shifting of said central rod towards the position closing the corresponding valve member.

* * * * *